United States Patent
Cohn (10) Patent No.: US 10,254,725 B2
(45) Date of Patent: Apr. 9, 2019

(54) UTILIZING AUTOMATED LIGHTING SYSTEM TO DETERMINE OCCUPANCY

(71) Applicant: International Business Machines Corporation, Armonk, NY (US)

(72) Inventor: John M Cohn, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 14/612,751

(22) Filed: Feb. 3, 2015

(65) Prior Publication Data
US 2016/0223395 A1    Aug. 4, 2016

(51) Int. Cl.
| G06F 17/40 | (2006.01) |
| G05B 15/02 | (2006.01) |
| H05B 37/02 | (2006.01) |
| F24F 11/30 | (2018.01) |
| G06F 11/30 | (2006.01) |
| F24F 120/10 | (2018.01) |

(52) U.S. Cl.
CPC .............. G05B 15/02 (2013.01); F24F 11/30 (2018.01); H05B 37/0227 (2013.01); H05B 37/0245 (2013.01); F24F 2120/10 (2018.01)

(58) Field of Classification Search
CPC ..................................................... G05B 15/02
See application file for complete search history.

(56) References Cited

U.S. PATENT DOCUMENTS

| 5,640,143 | A | * | 6/1997 | Myron ................. G08B 29/185 250/DIG. 1 |
| 6,909,921 | B1 | | 6/2005 | Bilger |
| 7,845,823 | B2 | | 12/2010 | Mueller et al. |
| 9,703,274 | B2 | | 7/2017 | Li |
| 2010/0025483 | A1 | | 2/2010 | Hoeynck et al. |
| 2011/0307112 | A1 | | 12/2011 | Barrilleaux |
| 2012/0066168 | A1 | | 3/2012 | Fadell et al. |
| 2013/0081479 | A1 | | 4/2013 | Miller et al. |
| 2013/0184887 | A1 | * | 7/2013 | Ainsley ................. G05B 15/02 700/291 |

OTHER PUBLICATIONS

Bartolini et al., "Counting People Getting In and Out of a Bus by Real-Time Image Sequence Processing," Image and Vision Computing 12.1, Jan. 1994, pp. 36-41.
Puleo, "Maturing Technology Brings Growing Acceptance of Sensors," Energy User News, 1991.

* cited by examiner

*Primary Examiner* — Phuong Huynh
(74) *Attorney, Agent, or Firm* — Michael A. Petrocelli (57) ABSTRACT

A method for utilizing an automated lighting system having a plurality of lighting fixtures with associated light sensors to determine occupancy of a plurality of occupants in an area of a building. Lighting level information is received from the lighting fixture sensors of the automated lighting system identifying lighting variations in an area to form a time-based history of lighting level variations. Analytic analysis is applied to the time-based history of lighting level variations to determine a time-based occupancy in the area.

20 Claims, 9 Drawing Sheets

UTILIZING AUTOMATED LIGHTING SYSTEM TO DETERMINE OCCUPANCY

BACKGROUND

Embodiments of the invention generally relate to automated lighting systems and, in particular, to area occupancy analytics based on an automated lighting system.

Modern lighting control systems, such as those used for new LED systems, have sophisticated light sensors used to control the individual light level and, in some cases, light color quality at every point. These sensing systems allow the brightness levels of individual light fixtures to be adjusted to maintain an even brightness level as ambient natural light levels change. This saves power and also maintains an even pleasing light level across a room throughout the day. In current utilization, the light sensor output is used to control the lighting level of just the lighting fixture where the sensor is placed. In general, the central lighting controller for the building would request a specific light level for the whole room, and the sensor and lights in the room would participate in a local control loop to maintain the requested level.

BRIEF SUMMARY

In one embodiment, a method, system, and computer program product are provided for utilizing an automated lighting system having a plurality of lighting fixtures with associated light sensors to determine occupancy of a plurality of occupants in an area of a building. Lighting level information is received from the light sensors of the automated lighting system identifying lighting level variations in an area to form a time-based history of lighting level variations. Analytic analysis is applied to the time-based history of lighting level variations to determine a time-based occupancy in the area.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

The following description is provided as an enabling teaching of embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

Embodiments of the invention use the sensing and communications infrastructure already available in computer-controlled building smart lighting systems to collect analytics on occupancy, location, and movement of people in a retail or office setting. These analytics can be used to determine occupancy counts and movement patterns in a building or can be combined with sales information to gather information on the effectiveness of store layout, promotional displays, and other information related to customer location and dwell times. This information can be used by the building owner/tenant to optimize building space utilization. A retail store owner can use this information to optimize store display placement. More importantly, this information can be sold to providers of packaged goods to help determine the effectiveness of packaging, product placement, and promotional campaigns. Although solutions using video cameras currently perform similar functions, such existing systems require separate fixtures, communications, and processing infrastructure to be installed. Such solutions are much more expensive and intrusive of customer privacy. A cloud framework may be used with a computer-controlled building lighting system in an embodiment.

With respect to terminology used in this disclosure, lighting fixture and luminaire are used interchangeably. The Illuminating Engineers Society uses the term "luminaire" which is defined in the IES Lighting Handbook and the 2011 National Electrical Code. Lighting fixture is not defined in any standard but is a more commonplace and traditional term than luminaire.

It is understood in advance that although this disclosure includes a detailed description on cloud computing, implementation of the teachings recited herein are not limited to a cloud computing environment. Rather, the disclosed embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of the cloud model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models included in the cloud model are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
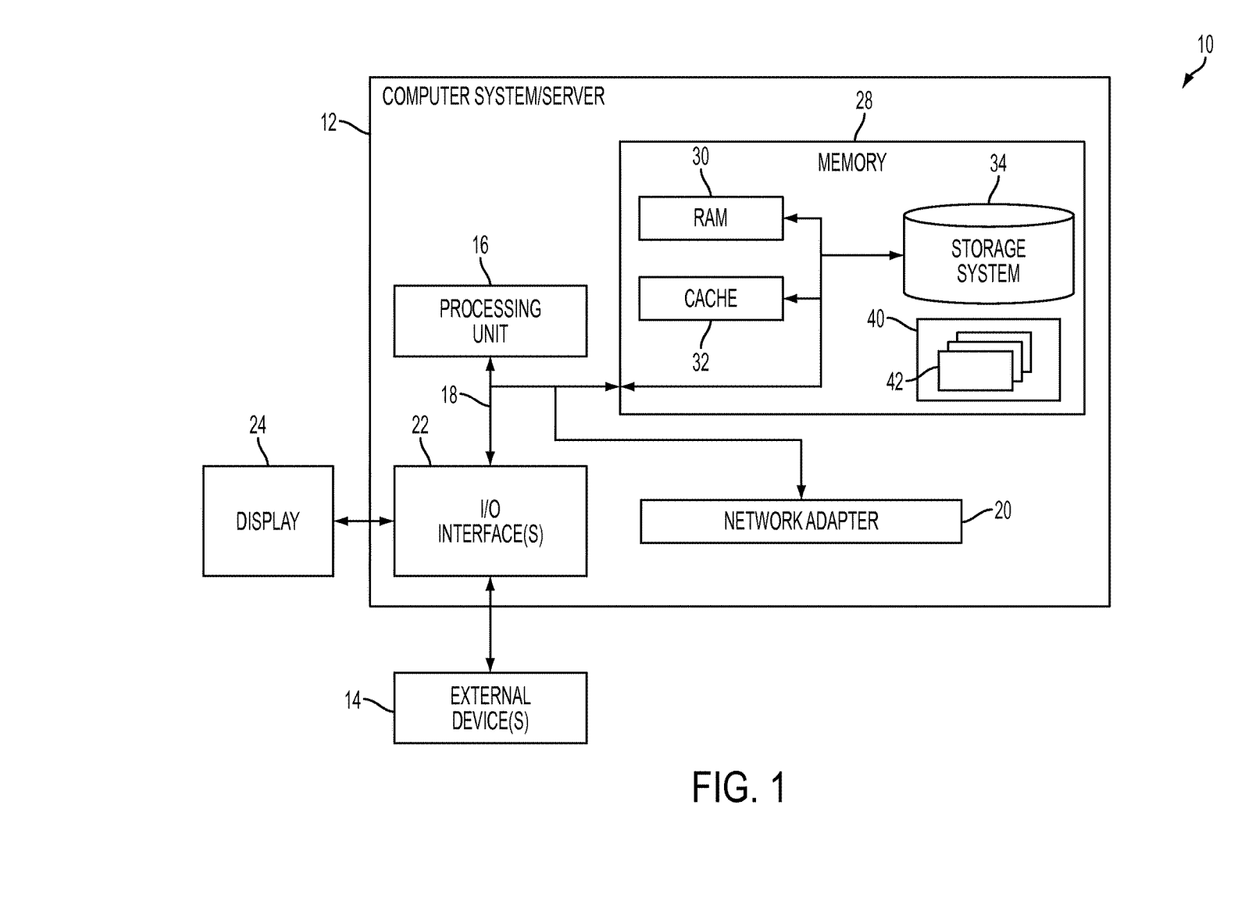
FIG. 1 illustrates a cloud computing node that may be used with a computer-controlled building lighting system in an embodiment.

Referring now to FIG. 1, a schematic of an example of a cloud computing node is shown. Cloud computing node 10 is only one example of a suitable cloud computing node and is not intended to suggest any limitation as to the scope of use or functionality of the embodiments described herein. Regardless, cloud computing node 10 is capable of being implemented and performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to, microcode, device drivers, redundant processing units, external disk drive arrays, RAID systems, tape drives, and data archival storage systems, etc.

Figure 2:
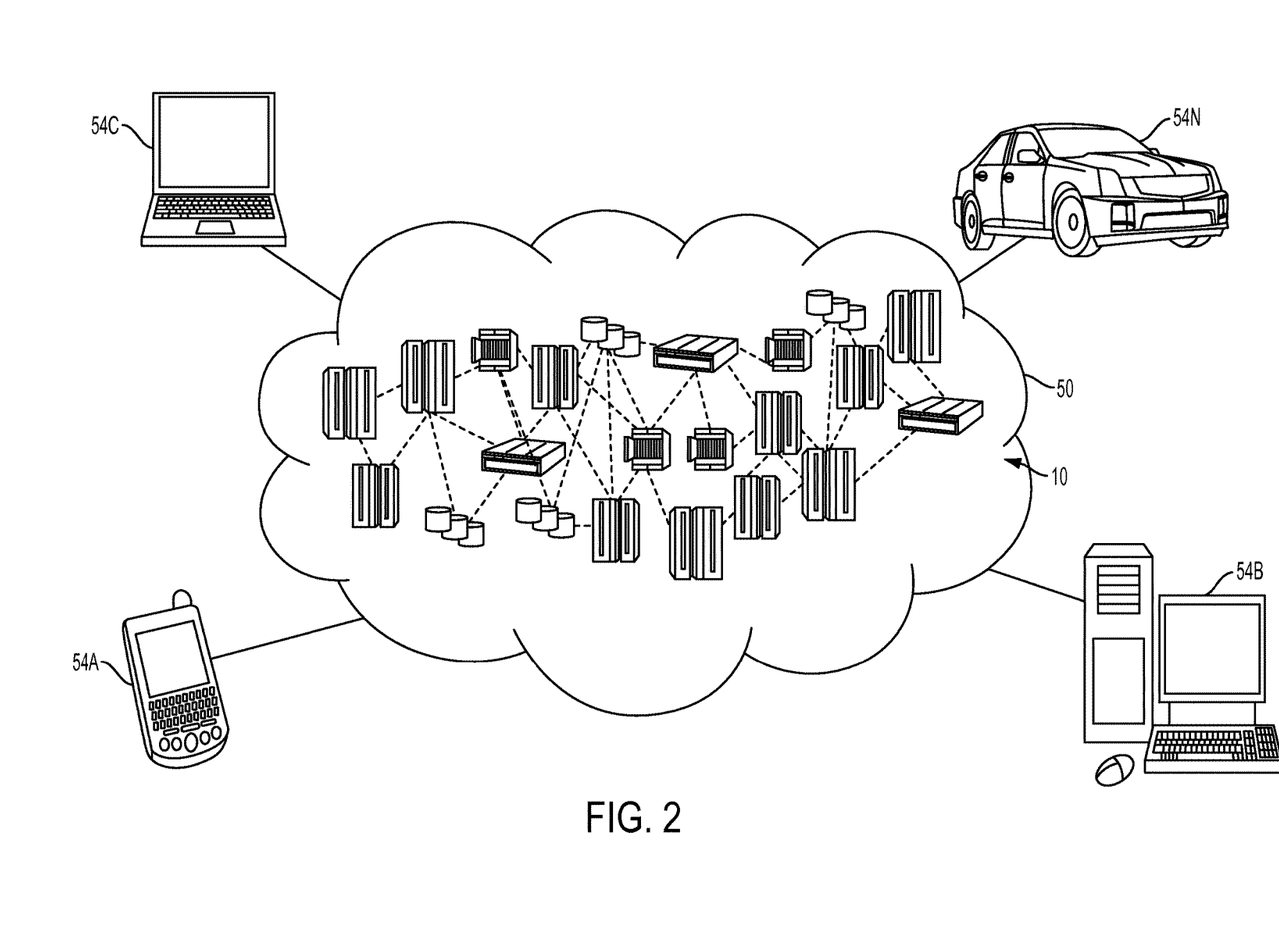
FIG. 2 illustrates a cloud computing environment that may be used with a computer-controlled building lighting system in an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
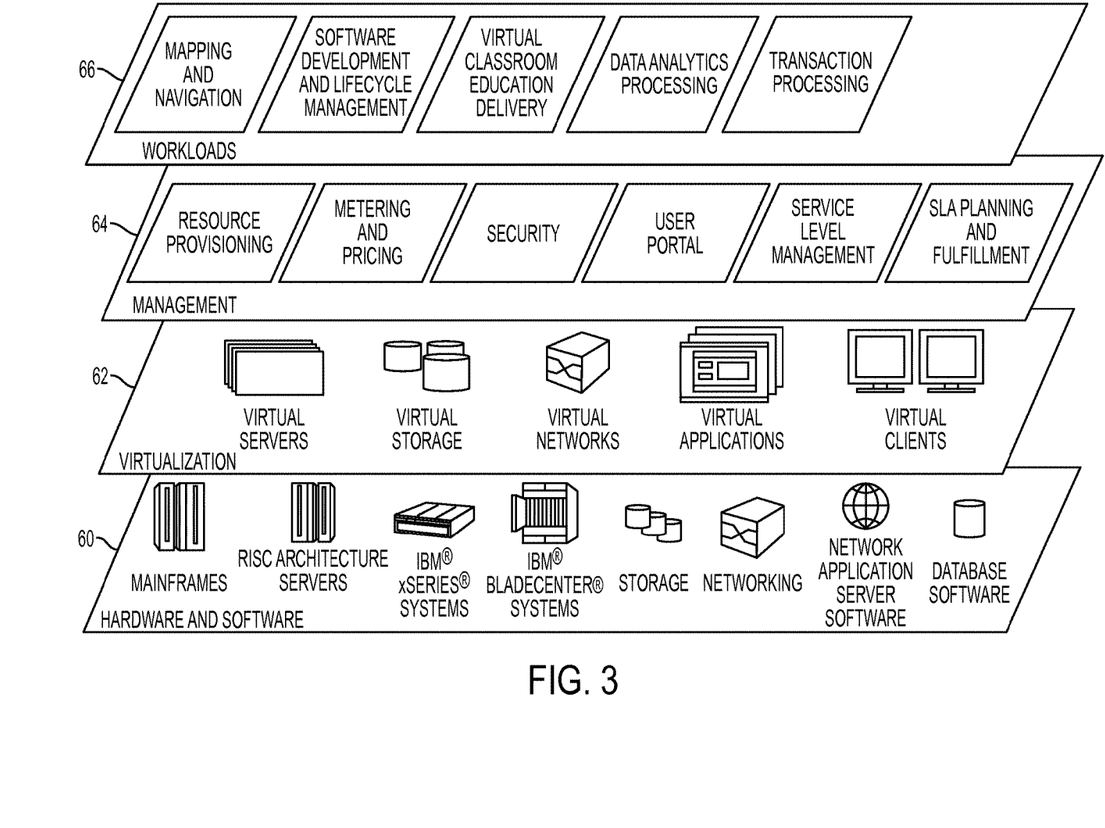
FIG. 3 illustrates abstraction model layers of a cloud computing environment in an embodiment.

Referring now to FIG. 3, a set of functional abstraction layers provided by cloud computing environment 50 is shown. It should be understood in advance that the components, layers, and functions shown in FIG. 3 are intended to be illustrative only and embodiments of are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing (e.g., building analytics management); and transaction processing.

Figure 4:
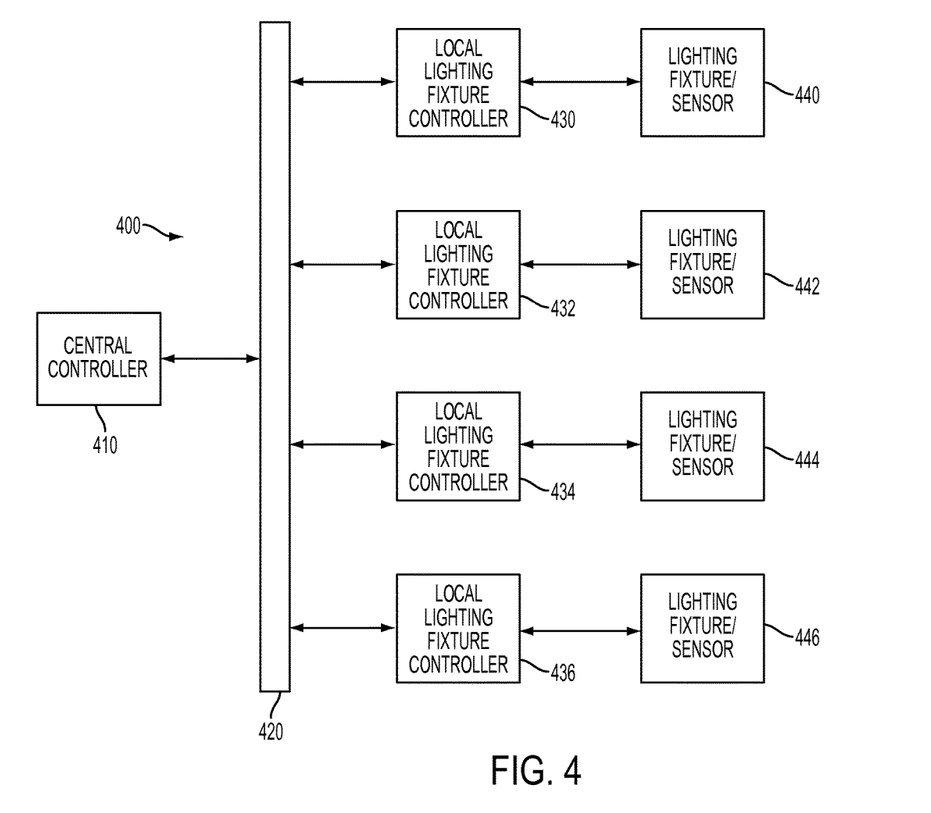
FIG. 4 illustrates a computer-controlled building lighting sensing and communications infrastructure that may be used in the disclosed embodiments.

The disclosed embodiments reuse most of the existing lighting infrastructure to gather analytics on what is occurring under the lighting fixtures and to communicate the information gathered to the controller where it can be analyzed. FIG. 4 illustrates an existing lighting and sensing infrastructure that may be used with the disclosed embodiments. This reuse will allow for a solution which is less expensive, less complicated, and less physically intrusive of privacy than existing systems that use distributed video cameras as a means to gather similar information.

As illustrated in FIG. 4, the building lighting control system 400 may include a plurality of LED lighting fixtures with associated sensors 440, 442, 444, 446. The plurality of lighting fixtures are distributed throughout an area of the building and generally located in a ceiling structure. Each lighting fixture/sensor may be coupled to a local lighting fixture controller 430, 432, 434, 436. The local lighting controllers may be connected via local area network 420 (e.g., a wired or wireless infrastructure to a central controller 410. Although four lighting fixtures/sensors are shown in FIG. 4, the building lighting control system 400 is not limited to the deployment of any specific number of lighting fixtures/sensors in an area and a plurality of lighting fixtures/sensors may be connected to each local lighting fixture controller in various configurations using various communications media and communications protocols. In addition, although four local lighting fixture controllers are shown in FIG. 4, the building lighting control system 400 is not limited to any specific number of local lighting fixture controllers connected to the central controller 410 via the local network 420.

The lighting sensors used in light emitting diode (LED) lighting control systems to control the individual light brightness level at every point in a room sends the sensor lighting level data to a central lighting controller where the sensor data can be processed for information.

In general, an LED lighting fixture may have a variety of mounting arrangements for the LED light sources, enclosure or housing arrangements, and shapes, and electrical and mechanical connection configurations. An LED lighting fixture may be coupled to, or packaged with, control circuitry relating to the operation of the LED light sources.

The central controller 410 can be implemented in numerous ways, such as with dedicated hardware, using one or more microprocessors that are programmed using software (e.g., microcode or firmware) to perform some of the functions disclosed herein, or as a combination of dedicated hardware to perform some functions and programmed microprocessors and associated circuitry to perform other functions.

In various implementations, the central controller 410 may be associated with one or more storage media (memory). In some implementations, the storage media may be encoded with one or more programs that, when executed on one or more processors, perform at least some of the functions discussed herein. Various storage media may be fixed within the central controller 410 or may be transportable, such that the one or more computer programs stored thereon can be loaded into a processor or controller so as to implement various aspects of the disclosed embodiments.

In one implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media.

Various implementations of networks suitable for interconnecting multiple devices may include any of a variety of network topologies and employ any of a variety of communication protocols. Furthermore, it should be readily appreciated that various networks of devices as discussed herein may employ one or more wireless, wire/cable, and/or fiber optic links to facilitate information transport throughout the network.

The disclosed embodiments add a relatively small amount of additional instrumentation to in-store computer-controlled lighting systems to gather analytics on the approximate count, location, and movement of customers in a retail store setting. Modern in-store lighting systems, particularly those for newer LED lighting systems, generally include (a) regularly spaced in ceiling lighting fixtures, (b) distributed sensing to determine ambient light levels, (c) distributed power to run the lighting fixtures, and (d) distributed wired or wireless communication to a building automation controller to control the state of each fixture.

Figure 5A:
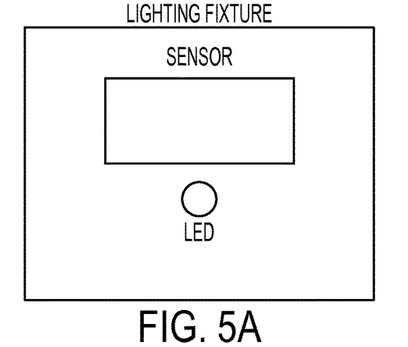
FIGS. 5A-5C illustrate application of single sensor LED lighting fixtures with a computer-controlled building lighting system in an embodiment.
Figure 5B:
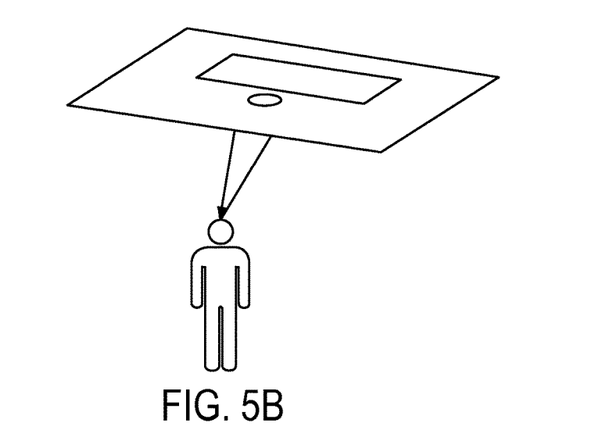
Figure 5C:
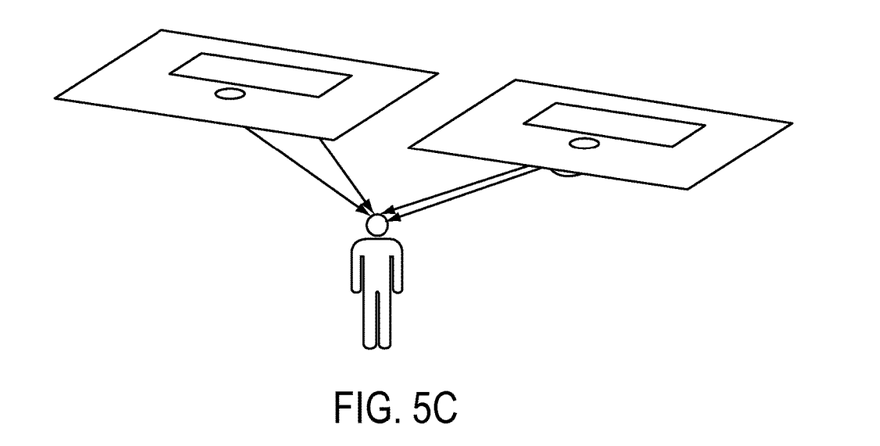

In one embodiment, the precise analog information gathered from the light sensors of the lighting fixtures as shown in FIG. 5A would be used as a source of information. This information could be communicated to the lighting central controller 410 using the existing control communications channel 420. It is assumed that customers moving under the lights would make small, but perceptible changes in the lighting levels detected by the sensors. Those lighting level variations could be correlated experimentally to the count, placement, and movement of customers as shown in FIG. 5B. Additional analytics and modeling could be performed on the gathered sensor data to map the movement of people from under one light fixture to another as shown in FIG. 5C. This would result in approximate measurements but could be sufficient for many applications.

Figure 6A:
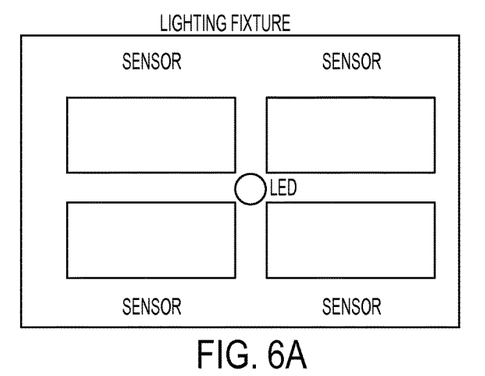
FIGS. 6A-6C illustrate application of quadrature sensor LED lighting fixtures with a computer-controlled building lighting system in an embodiment.
Figure 6B:
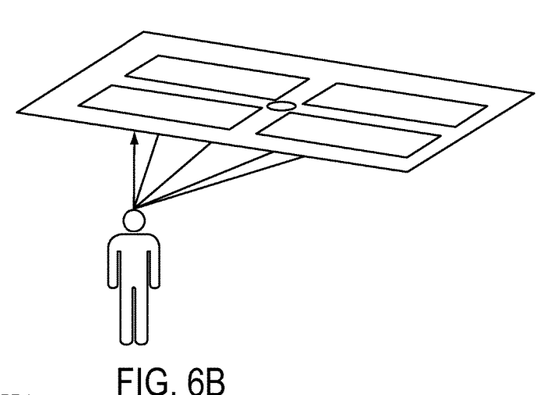
Figure 6C:
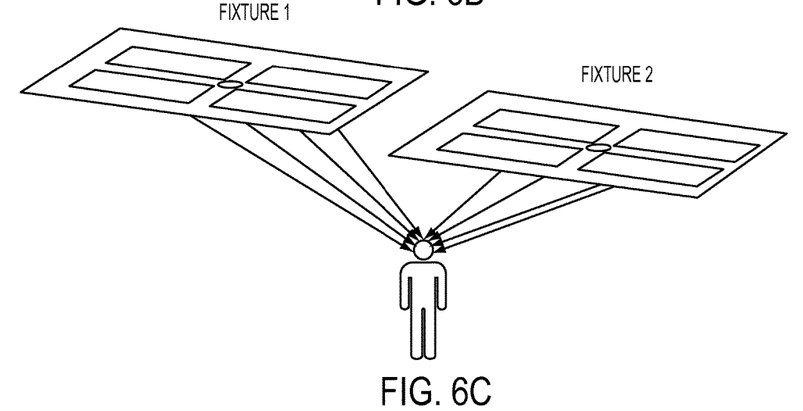

In another embodiment, the existing analog sensor inputs could be augmented to increase their spatial resolution. For example, a simple quadrature sensor, such as shown in FIG. 6A, could be used to determine both the distance and direction of a person or an object underneath the light sensor as shown in FIG. 6B. Simple mathematics would allow positions and motions of people to be calculated between light sensors as shown in FIG. 6C.

In another embodiment, the simple light sensors could be complemented with video cameras (not shown). The data stream from the video cameras could be processed easily for location and motion. Although this embodiment does add considerable cost and complexity, it would still be able to share the physical structure, power, and communications infrastructure already being used for the building lighting control system 400. This would make this embodiment considerably less expensive and simpler to install than a standalone camera surveillance system.

Figure 7A:
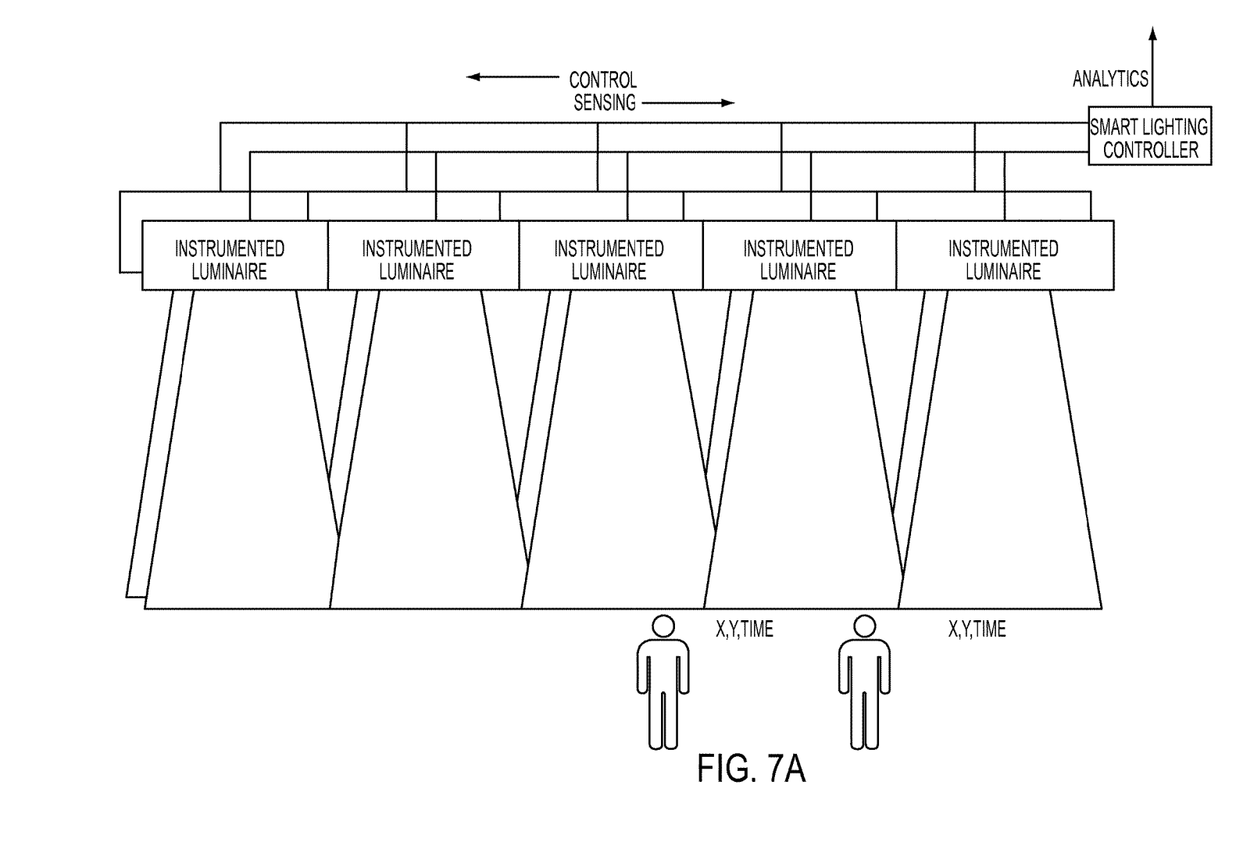
FIG. 7A illustrates a computer-controlled building lighting sensing and communications system in communication with analytics software in an embodiment.

The sensor-detected lighting level variation information (data) from each of the preceding embodiments could be collected and sent to the building automation system using the existing wired or wireless infrastructure 420 of the lighting control system 400. The data could be passed through the analytics software necessary to interpret the lighting level variation data. The interpreted data could then be transmitted to an analytics management system in the cloud environment that would be responsible for fusing the interpreted information with information from other sources, e.g., sales data, and providing the analytics stream to the analytics "customer." This flow is shown in FIG. 7A in which the lighting fixtures are referred to as instrumented luminaires. The customers could be the building owners or packaged goods manufacturers. The owners could learn how many people were in the store or they could correlate the likelihood of buying a particular product based on the amount of dwell time a person spent in front of a store fixture which would provide good feedback on the effectiveness of a display. A packaged goods manufacturer could use the same information to determine how effective a new packaging style or display design affects sales.

Figure 7B:
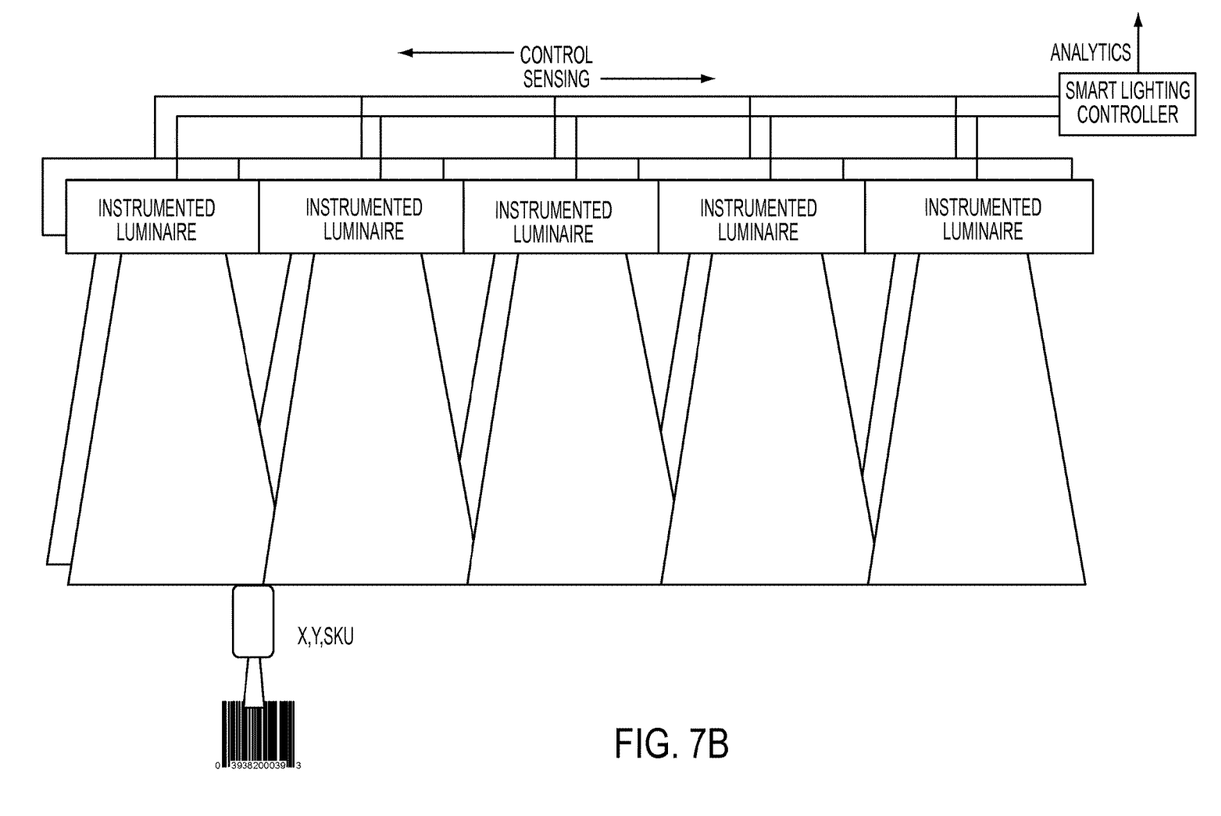
FIG. 7B illustrates a computer-controlled building lighting sensing and communications system in communication with analytics software and a smart phone bar code reader application in an embodiment.

To make correlation easy for the packaged goods scenario, a simple smart phone application could allow a product code identifier (e.g., stock keeping unit (SKU)) to be read. The system could then correlate the position of the person holding the smart phone to the SKU code. That information could then be used to correlate a person's location to a product SKU code which would make the analytics more product specific. The flow is illustrated in FIG. 7B in which the lighting fixtures again are referred to as instrumented luminaires.

The present invention may be a system, a method, and/or a computer readable product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments described.

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
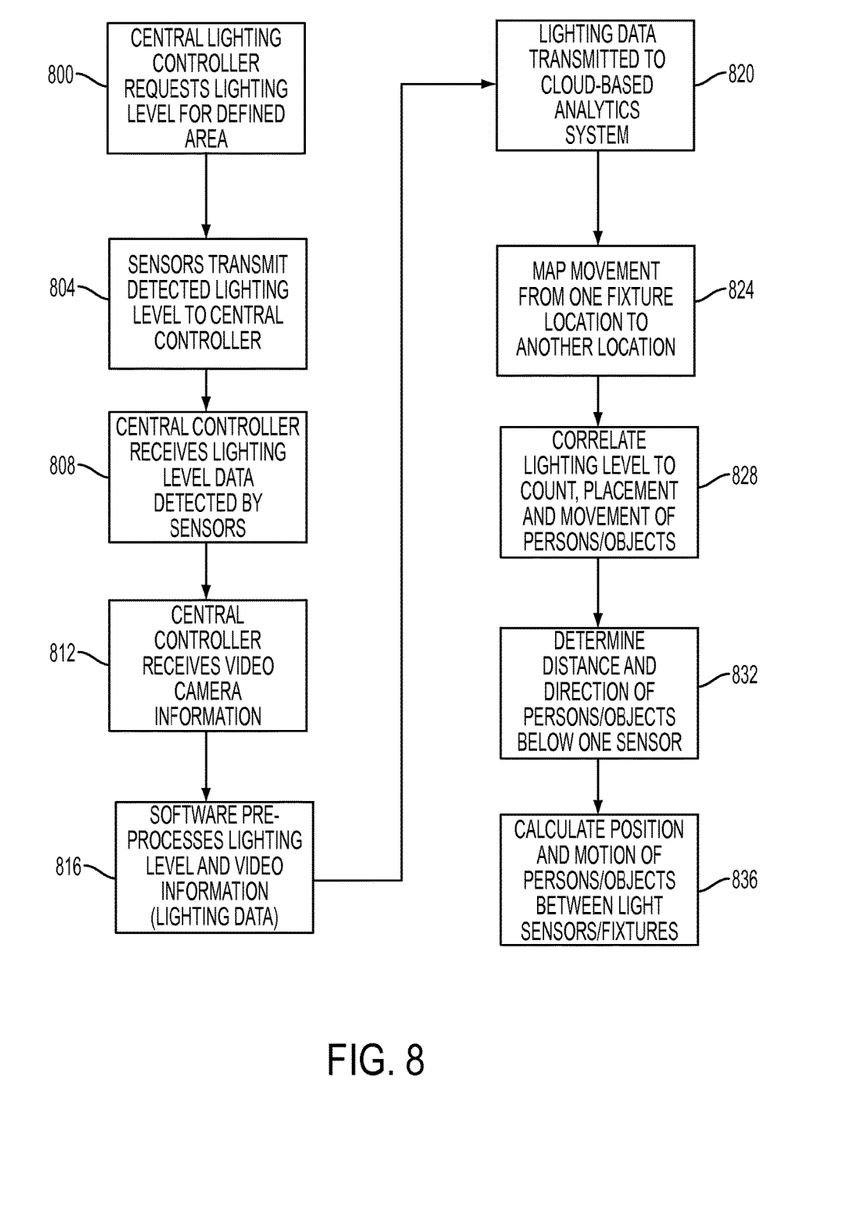
FIG. 8 illustrate processing logic for the occupancy analytics system in an embodiment.

The flowchart in FIG. 8 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Processing of light sensor/fixture data commences with the central lighting controller requesting lighting levels from light sensors located in defined areas of the room as indicated in logic block 800. In response to the request from the central lighting controller, the sensors/lighting fixture controllers may transmit sensor level data to the central lighting controller as indicated in logic block 804. The central lighting controller receives the lighting level data detected by the sensors as indicated in logic block 808. In some embodiments, sensor lighting level variation information may be augmented with video camera information as indicated in logic block 812. The sensor lighting level variation data may then be pre-processed by software operating on a processor in the central lighting controller as indicated in logic block 816. Video information, if any, may also be pre-processed and combined with lighting level variation information (collectively, lighting level data).

Next, the lighting level data may be transmitted to a cloud-based analytics management system including a plurality of cloud computing nodes such as the computing node depicted in FIG. 1. This step is indicated in logic block 820. Analytics and modeling then may be performed on the collected lighting level data to map movement of people from below one lighting fixture to another lighting fixture as indicated in logic block 824. Lighting level variations detected by the sensors may be correlated to the count, placement, and movement of people or objects as indicated in logic block 828.

In one embodiment, the distance and direction of movement of a person or object below a light sensor may be determined using quadrature sensors as indicated in logic block 832. The position and motion of persons or objects between light sensors/fixtures may be calculated as indicated in logic block 836. Collected light sensor data may be transmitted to a cloud-based analytics management system as indicated in logic block 836.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the disclosed embodiments are possible without departing from the scope of the present invention. In addition, it is possible to use some of the features of the embodiments disclosed without the corresponding use of the other features. Accordingly, the foregoing description of the disclosed embodiments is provided for the purpose of illustrating the principles of the invention, and not in limitation thereof, since the scope of the invention is defined solely by the appended claims.

What is claimed:

1. A method for utilizing an automated lighting system having a plurality of lighting fixtures with associated light sensors to determine occupancy of a plurality of occupants in an area of a building comprising:
   in response to a lighting level request, receiving lighting level variation information from the light sensors of the automated lighting system identifying lighting level variations in the area to form a time-based history of lighting level variations, wherein the light sensors comprise a plurality of quadrature sensors capable of determining a time-based direction of movement of occupants, the—time-based direction of movement comprises both a distance and a direction of the occupants underneath the light sensors such that a position and a motion of the occupants between light sensors can be determined; and
   applying analytic analysis to the time-based history of lighting level variations to determine a time-based occupancy in the area.

2. The method for utilizing an automated lighting system to determine occupancy of claim 1, wherein the plurality of lighting fixtures comprises light emitting diode (LED) lighting fixtures coupled to a control circuitry.

3. The method for utilizing an automated lighting system to determine occupancy of claim 1, further comprising:
   receiving image information from the area to augment the received lighting level variation information from the automated lighting.

4. The method for utilizing an automated lighting system to determine occupancy of claim 1, further comprising:
   applying analytic analysis to the time-based history of lighting level variations as a software service in a cloud environment.

5. The method for utilizing an automated lighting system to determine occupancy of claim 1, further comprising:
   correlating the lighting level variations to a count, a placement, and a movement of occupants.

6. The method for utilizing an automated lighting system to determine occupancy of claim 1, further comprising:
   mapping movement of occupants or objects from below one lighting fixture location to another lighting fixture location in the area and determining a distance and direction of movement of occupants or objects.

7. The method for utilizing an automated lighting system to determine occupancy of claim 1, further comprising:
   transmitting lighting level variation information to a cloud-based analytic management system.

8. A system for utilizing an automated lighting system having a plurality of lighting fixtures with associated light sensors to determine occupancy of a plurality of occupants in an area of a building, the system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
      in response to a lighting level request, receiving lighting level variation information from the light sensors of the automated lighting system identifying lighting level variations in the area to form a time-based history of lighting level variations, wherein the light sensors comprise a plurality of quadrature sensors capable of determining a time-based direction of movement of occupants, the time-based direction of movement comprises both a distance and a direction of the occupants underneath the light sensors such that a position and a motion of the occupants between light sensors can be determined; and applying analytic analysis to the time-based history of lighting level variations to determine a time-based occupancy in the area.

9. The system for utilizing an automated lighting system to determine occupancy of claim 8, wherein the plurality of lighting fixtures comprises light emitting diode (LED) lighting fixtures coupled to a control circuitry.

10. The system for utilizing an automated lighting system to determine occupancy of claim 8, further comprising:
receiving image information from the area to augment the lighting level variation information from the automated lighting system.

11. The system for utilizing an automated lighting system to determine occupancy of claim 8, further comprising:
correlating the lighting level variations to a count, a placement, and a movement of occupants.

12. The system for utilizing an automated lighting system to determine occupancy of claim 8, further comprising:
mapping movement of occupants or objects from below one lighting fixture location to another lighting fixture location in the area and determining a distance and direction of movement of occupants or objects.

13. The system for utilizing an automated lighting system to determine occupancy of claim 8, further comprising:
transmitting lighting level variation information to a cloud-based analytic management system.

14. The system for utilizing an automated lighting system to determine occupancy of claim 8, further comprising:
applying analytic analysis to the time-based history of lighting level variations as a software service via the memory device and processor in a cloud environment.

15. A computer program product for utilizing an automated lighting system having a plurality of lighting fixtures with associated light sensors to determine occupancy of a plurality of occupants in area, the computer program product comprising:
a computer readable non-transitory article of manufacture tangibly embodying computer readable instructions which, when executed, cause a computer to carry out a method comprising:
in response to a lighting level request, receiving lighting level variation information from the light sensors of the automated lighting system identifying lighting level variations in the area to form a time-based history of lighting level variations, wherein the light sensors comprise a plurality of quadrature sensors capable of determining a time-based direction of movement of occupants, the—time-based direction of movement comprises both a distance and a direction of the occupants underneath the light sensors such that a position and a motion of the occupants between light sensors can be determined; and
applying analytic analysis to the time-based history of lighting level variations to determine a time-based occupancy in the area.

16. The computer program product for utilizing an automated lighting system to determine occupancy of claim 15, wherein the plurality of lighting fixtures comprises light emitting diode (LED) lighting fixtures coupled to a control circuitry.

17. The computer program product for utilizing an automated lighting system to determine occupancy of claim 15, further comprising:
receiving image information from the area to augment the received lighting level variation information from the automated lighting system.

18. The computer program product for utilizing an automated lighting system to determine occupancy of claim 15, further comprising;
correlating the lighting level variations to a count, a placement, and a movement of occupants.

19. The computer program product for utilizing an automated lighting system to determine occupancy of claim 15, further comprising:
mapping movement of occupants or objects from below one lighting fixture location to another lighting fixture location in the area and determining a distance and direction of movement of occupants or objects.

20. The computer program product for utilizing an automated lighting system to determine occupancy of claim 15, further comprising:
transmitting lighting level variation information to a cloud-based analytic management system.

\* \* \* \* \*